(12) United States Patent
Ramamurthi et al.

(10) Patent No.: US 11,546,812 B2
(45) Date of Patent: Jan. 3, 2023

(54) SYSTEMS AND METHODS FOR DISTRIBUTED UNIT HANDOVER

(71) Applicant: Verizon Patent and Licensing Inc., Arlington, VA (US)

(72) Inventors: Vishwanath Ramamurthi, San Ramon, CA (US); Arda Aksu, Martinez, CA (US); Jin Yang, Orinda, CA (US); Lalit R. Kotecha, San Ramon, CA (US)

(73) Assignee: Verizon Patent and Licensing Inc., Basking Ridge, NJ (US)

(*) Notice: Subject to any disclaimer, the term of this patent is extended or adjusted under 35 U.S.C. 154(b) by 331 days.

(21) Appl. No.: 16/578,820

(22) Filed: Sep. 23, 2019

(65) Prior Publication Data

US 2021/0092650 A1 Mar. 25, 2021

(51) Int. Cl.
*H04W 36/00* (2009.01)
*H04W 24/08* (2009.01)
*H04W 24/10* (2009.01)
*H04W 36/08* (2009.01)
*H04W 60/00* (2009.01)
*H04W 36/02* (2009.01)
*H04W 88/08* (2009.01)

(52) U.S. Cl.
CPC ....... *H04W 36/0044* (2013.01); *H04W 24/08* (2013.01); *H04W 24/10* (2013.01); *H04W 36/0058* (2018.08); *H04W 36/08* (2013.01); *H04W 60/00* (2013.01)

(58) Field of Classification Search
None
See application file for complete search history.

(56) References Cited

U.S. PATENT DOCUMENTS

| | | | |
|---|---|---|---|
| 2016/0262066 A1* | 9/2016 | Ozturk | H04W 36/08 |
| 2018/0317137 A1* | 11/2018 | Loehr | H04W 36/023 |
| 2019/0116528 A1* | 4/2019 | Tang | H04W 36/18 |
| 2019/0166526 A1* | 5/2019 | Xu | H04W 80/08 |
| 2019/0387444 A1* | 12/2019 | Byun | H04W 36/0072 |
| 2020/0077287 A1* | 3/2020 | Prasad | H04W 72/005 |
| 2020/0077466 A1* | 3/2020 | Liu | H04W 80/02 |
| 2020/0112879 A1* | 4/2020 | Shimoda | H04W 16/32 |
| 2020/0229049 A1* | 7/2020 | Wu | H04W 88/085 |
| 2021/0160735 A1* | 5/2021 | Fujishiro | H04W 76/30 |

* cited by examiner

*Primary Examiner* — Jeffrey M Rutkowski
*Assistant Examiner* — Ning Li

(57) ABSTRACT

A system described herein may provide a technique for the handover of a User Equipment ("UE") from a first Distributed Unit ("DU") of a wireless network to a second DU in a manner that minimizes or interruption of the delivery of traffic to the UE. When the UE is attached to a first DU, one or more second DUs may be identified as candidates for attachment to the UE. The one or more second DUs may be pre-loaded with context information and/or traffic for the UE. In some embodiments, a third mesh DU ("MDU") may be identified as a candidate for attachment to a first MDU that is attached to a second MDU. The third MDU may be pre-loaded with context information and/or traffic for the first MDU.

20 Claims, 15 Drawing Sheets

SYSTEMS AND METHODS FOR DISTRIBUTED UNIT HANDOVER

BACKGROUND

Wireless telecommunication networks provide network connectivity to user equipment ("UE"), such as mobile telephones or other wireless communication devices, via a radio access network ("RAN"). A RAN may include multiple radios, which may be distributed geographically, via which UEs may connect.

DETAILED DESCRIPTION OF THE PREFERRED EMBODIMENTS

The following detailed description refers to the accompanying drawings. The same reference numbers in different drawings may identify the same or similar elements.

Embodiments described herein provide for seamless communications in situations where UEs connect to a wireless network via different radios (e.g., radios that are distributed geographically, radios that operate at different frequency bands, radios that offer different coverage area sizes, etc.). For instance, the wireless network may include multiple DUs that each provide differentiated wireless access to UEs (e.g., where different DUs are located in different geographic regions, operate at different frequency bands, etc.). As described herein, a DU controller ("DUC") may maintain context information for a given UE that is wirelessly attached to a given DU. The DUC may detect a potential connectivity issue (e.g., loss of signal strength, overloading of the DU, etc.) between the UE and the DU, and may identify one or more other DUs that are candidates for attachment by the UE (e.g., a less loaded DU, a DU that is located closer to the UE, etc.). The DUC may "pre-load" the candidate DU(s) with the context information associated with the UE, such that if the UE eventually attaches to one of the candidate DUs, the candidate DU is prepared with the context information for the UE, and the network can seamlessly continue communicating with the UE via the candidate DU. As described below, such embodiments may result in a faster, more robust, and/or more seamless handover of the UE from one DU to another, as compared to implementations in which the context for a UE is provided to a DU only after the UE attaches to the DU.

Figure 1A:
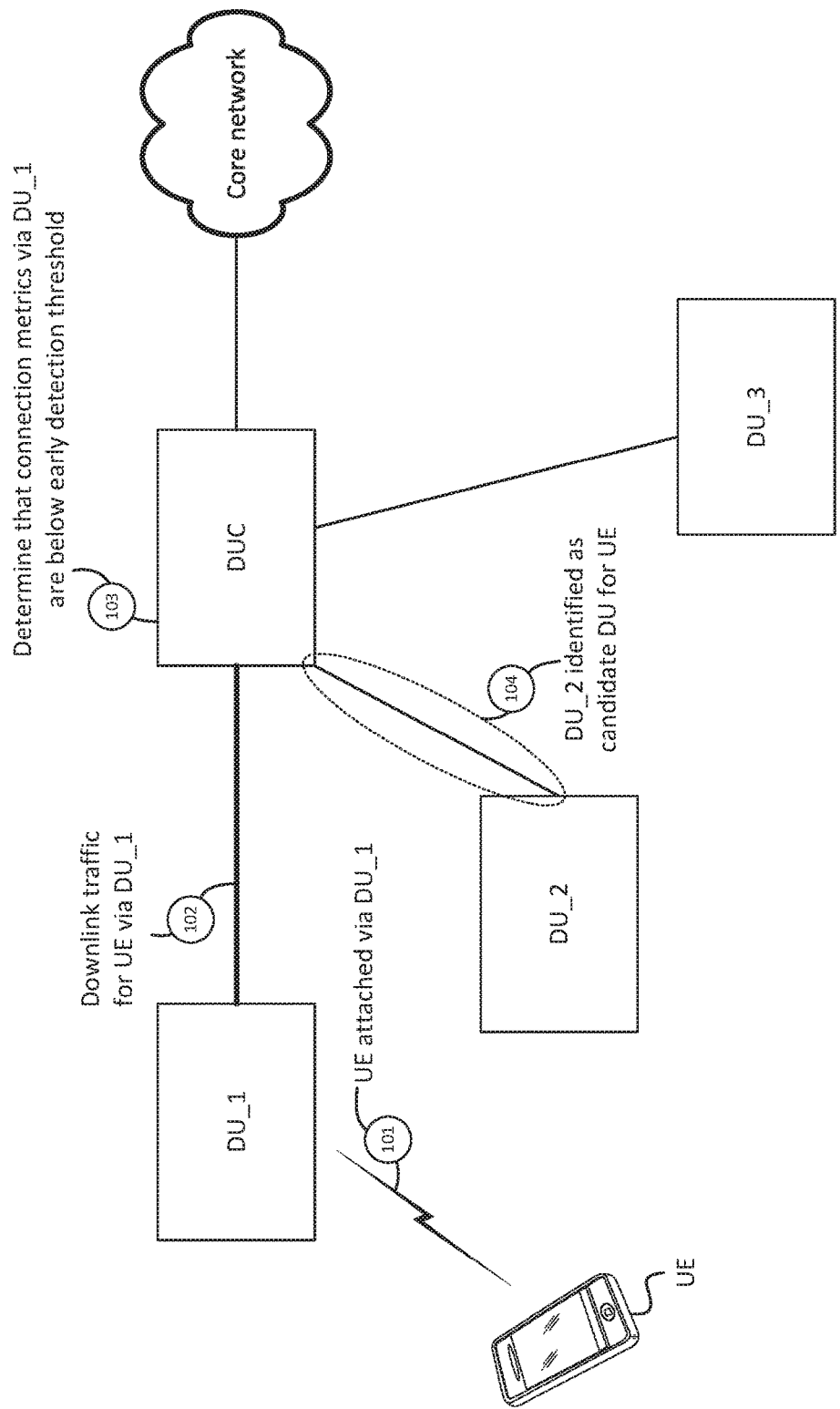
FIGS. 1A-1D illustrate an example overview of one or more embodiments described herein, in which a distributed unit ("DU") may be pre-loaded with context information in order to facilitate seamless communications with a UE that is currently attached to a different DU.

As shown in FIG. 1A, a UE may be wirelessly attached (at 101) to a particular DU (i.e., DU_1 in this example) via a radio frequency ("RF") interface. DU_1 may be one DU out of a group of DUs (which also includes DU_2 and DU_3) that are communicatively coupled with a DUC. As described herein, the DUC may be communicatively coupled to, and/or may be implemented as a component of, a Central Unit ("CU") that coordinates, among other functions, mobility and handover between the illustrated DUs.

As shown, DU_1 may receive (at 102) traffic for the UE from the DUC, as denoted in the figure by the bolded black line between the DUC and DU_1. Although "downlink" traffic (i.e., traffic from a core of the wireless network to the UE) is discussed herein, it is to be understood that the illustrated DUs and the DUC also handle uplink traffic (i.e., traffic from the UE) as well. DU_1 may wirelessly provide the downlink traffic to the UE via the RF interface between DU_1 and the UE.

DU_1 and the DUC may maintain context information that facilitates communications between the UE and the wireless network. For instance, DU_1 and the DUC may store Packet Data Convergence Protocol ("PDCP") context information (e.g., PDCP sequence numbers and/or other PDCP context information), Radio Link Control ("RLC") context information (e.g., RLC sequence numbers and/or other RLC context information), and/or other suitable context information. The DUC may, on an ongoing basis, update DU_1 with current context information.

The DUC may also maintain information regarding connection metrics between DU_1 and UE, such as signal strength (e.g., a Received Signal Strength Indicator ("RSSI") value reported by the UE, Signal to Interference and Noise Ratio ("SINR"), and/or some other indicator of signal strength between the UE and DU_1), error rate, packet loss, latency, throughput, and/or other connection-related metrics. Additionally, or alternatively, the DUC may maintain information regarding network load and/or capacity of DU_1 (e.g., a quantity of connections between DU_1 and a set of UEs, an amount of used or available resource blocks associated with DU_1, an amount of used and/or available bandwidth associated with DU_1, etc.). The DUC may determine (at 103) that the connection metrics associated with the connection of UE and DU_1 exceed an early detection threshold. The early detection threshold may be different than a second threshold that is used to determine that the UE should be handed over to a different DU.

For instance, the DUC may determine that the SINR between the UE and DU_1 is declining, and/or is below an early detection threshold SINR but is greater than a second threshold SINR. As another example, the DUC may determine that the network load of DU_1 exceeds an early detection threshold amount of load, but does not exceed a second threshold amount of load. In some embodiments, the DUC may generate a score that reflects multiple factors. For instance, the score may be generated based on normalized values associated with one or more connection metrics and/or one or more metrics of network load of DU_1. In some such embodiments, the early detection threshold may be on a same scale as the score, and the score may be evaluated against the early detection threshold.

In the example situations described above, since the metrics discussed above (e.g., SINR and/or network load of DU_1) do not exceed the second threshold, the UE may remain attached to DU_1 (e.g., the DUC may not determine that the UE should be handed over to another DU). However, the DUC may, based on determining that the early detection threshold is exceeded, identify one or more candidate DUs to which the UE may attach in the future. For instance, the DUC may identify (at 104) that DU_2 is a candidate for attachment to UE based on one or more factors. For instance, the DUC may identify that a coverage area of DU_2 is geographically closer to the UE than DU_1 or DU_3, that the UE is moving towards the coverage area of DU_2, that DU_2 has more available capacity and/or lower load than DU_1 and/or DU_3, or the like.

Figure 1B:
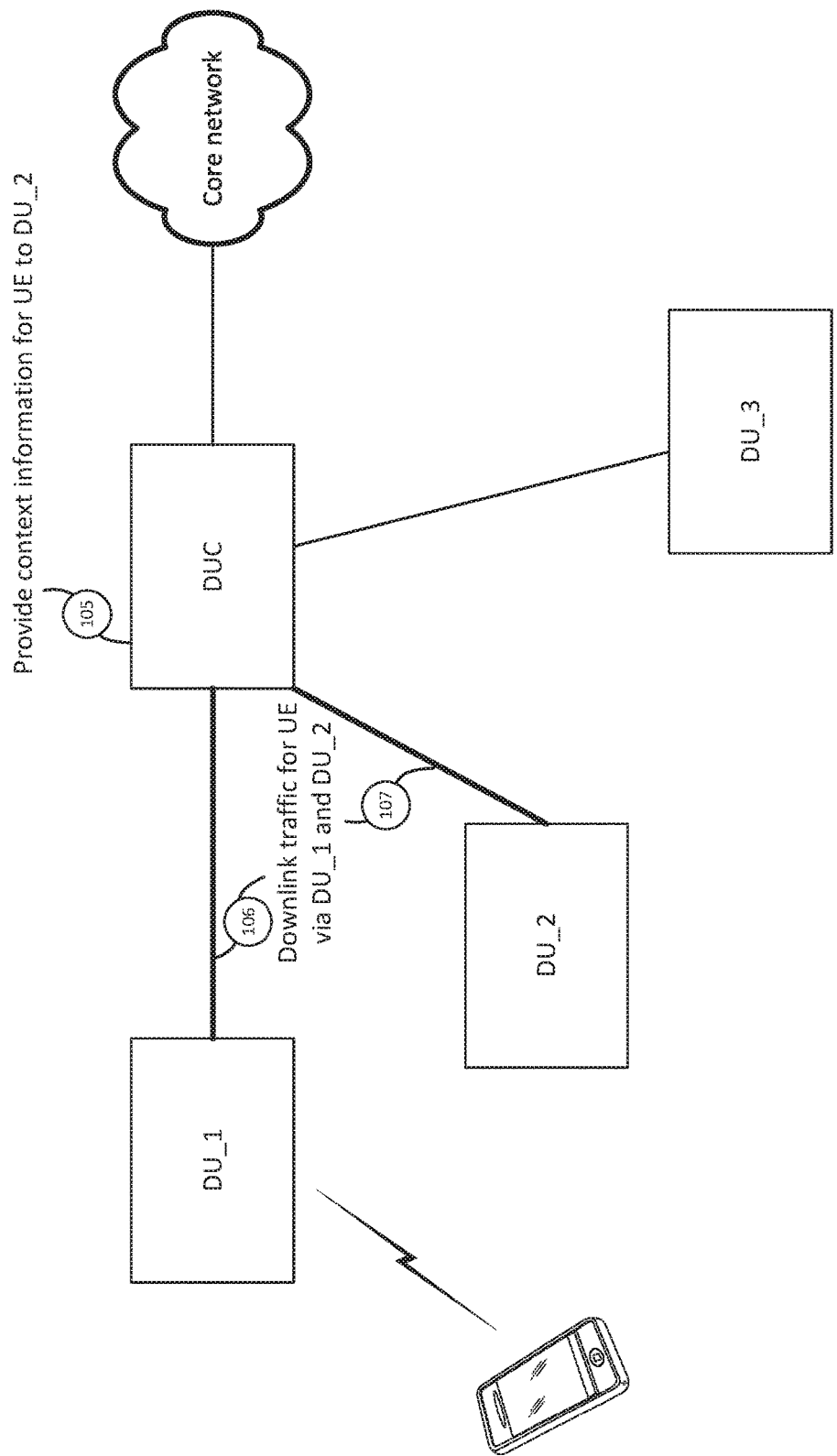

As shown in FIG. 1B, based on the identification of DU_2 as a candidate DU for attachment to the UE, the DUC may provide (at 105) the context information, for the UE, to DU_2. Furthermore, the DUC may, on an ongoing basis, provide (e.g., simultaneously, or substantially simultaneously) updated context information to DU_1 and DU_2. In this manner, DU_1 and DU_2 maintain an up-to-date context for the UE. Additionally, the DUC may continue to provide (at 106) downlink traffic for the UE to DU_1. Further, the DUC may also provide (at 107) downlink traffic for the UE to DU_2. In this manner, both DU_1 and DU_2 may receive a copy of the downlink traffic for the UE from the DUC. That is, although the UE remains attached to DU_1, DU_2 may be available for a seamless handover of the UE to DU_2, by using the "pre-loaded" context information and the downlink traffic provided by the DUC.

Figure 1C:
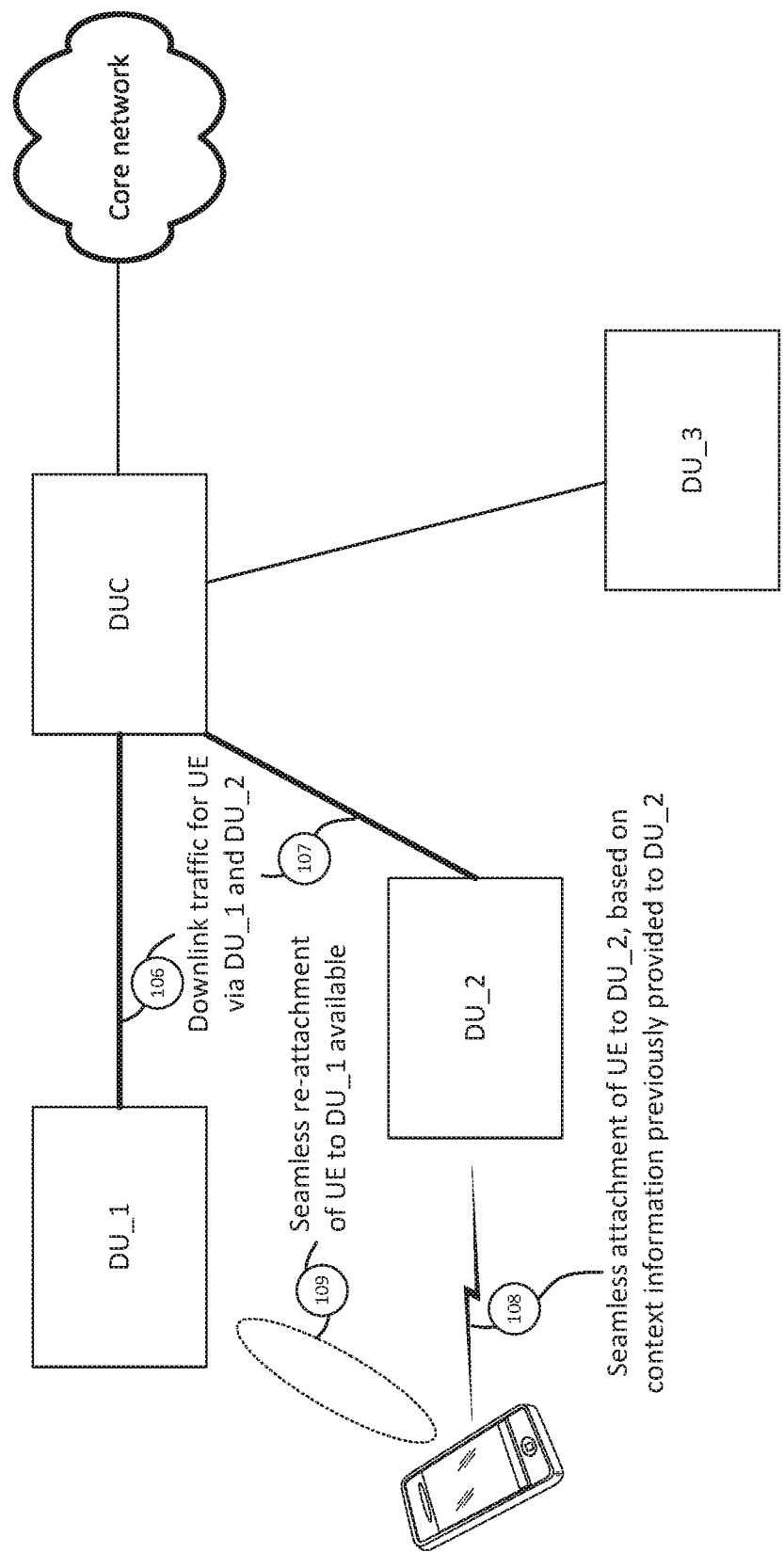

For example, as shown in FIG. 1C, the UE may attach (at 108) to DU_2. For example, the UE may have been instructed by the DUC to attach to DU_2 (e.g., if the DUC detected that the connection metrics and/or the load metrics of DU_1 exceed a second threshold), and/or may have autonomously (e.g., without instruction from the DUC or another device) attached to DU_2. As mentioned above, because DU_2 has been pre-loaded with context information, the interruption of connectivity between the UE and the network may be reduced, compared to implementations in which a context is established after attachment.

As further shown in FIG. 1C, DU_1 may continue to receive (at 106) up-to-date context information and downlink traffic from the DUC. Continuing to receive the context information and downlink traffic may allow for the seamless reattachment (at 108) of the UE to DU_1. For instance, in situations where the UE intermittently alternates between DU_1 and DU_2 (e.g., when the UE is located in overlapping coverage areas of DU_1 and DU_2), the maintained context information at both DUs may allow for a more seamless transition between these DUs than implementations where contexts are reestablished at each attachment.

Figure 1D:
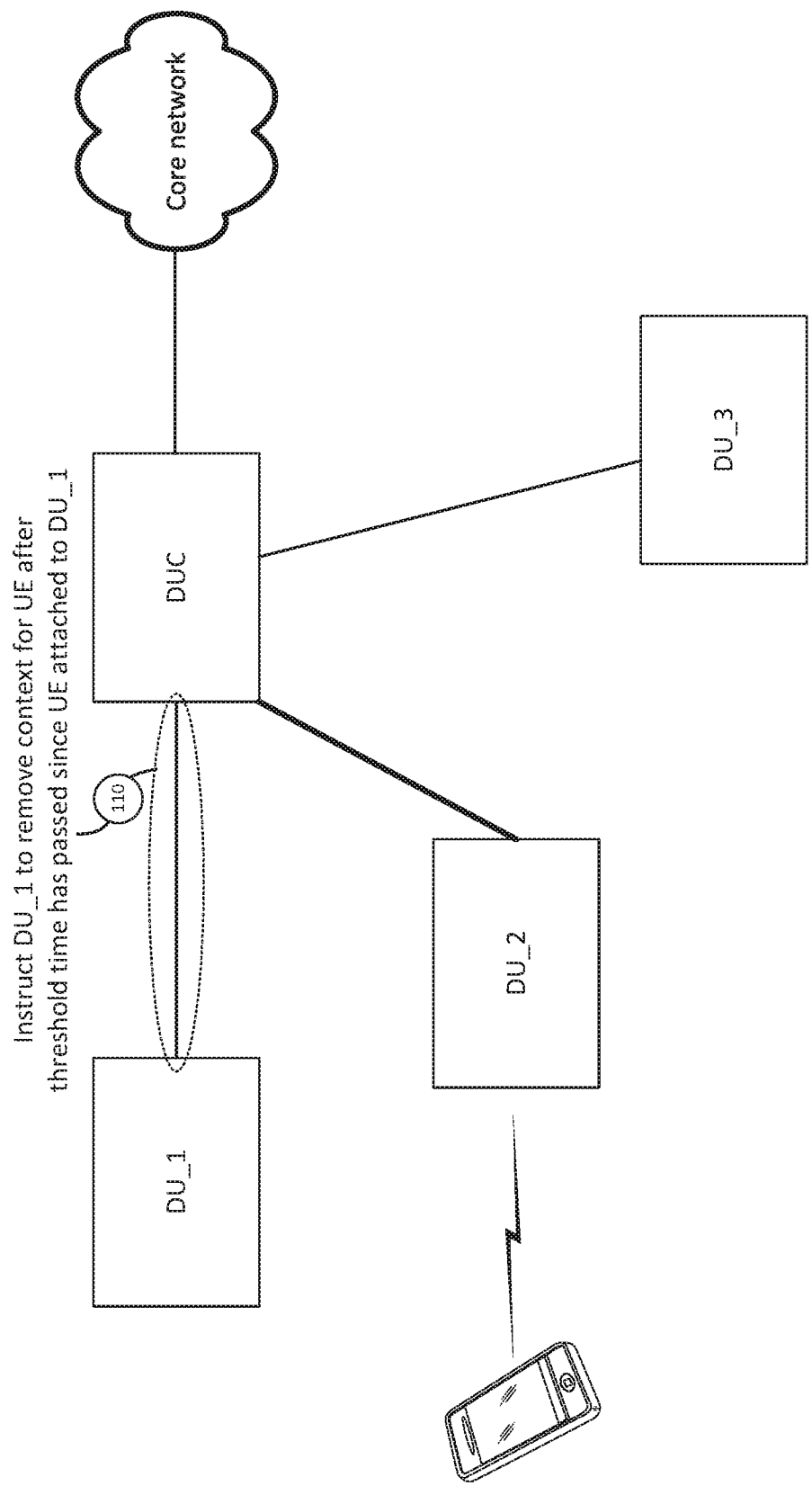

Once it is unlikely that the UE will attach (or reattach) to a given DU, it may be advantageous to remove context information regarding the UE, and/or to stop providing up-to-date context information regarding the UE. For instance, as shown in FIG. 1D, the DUC may track an amount of time that has passed since the UE attached to a given DU (i.e., DU_1, in this example). Assume, in this example, that the UE has not attached to DU_1 for at least a threshold amount of time (e.g., thirty seconds, one minute, ten minutes, etc.). Based on determining that the UE has not attached to DU_1 for at least the threshold amount of time, the DUC may instruct (at 110) DU_1 to remove the context for the UE. Removing the context, by DU_1, may free up resources (e.g., processing, memory, and/or network resources) that were expended in maintaining the context for the UE.

In some scenarios, a network may include multiple DUCs, where each DUC is communicatively coupled to a distinct set of DUs. As described herein, when a candidate DU (e.g., a DU that a UE may likely attach to, after being attached to a given DU) is communicatively coupled to a different DUC than a DUC that is communicatively coupled to a DU to which the UE is attached, the candidate DU may be pre-loaded with context information in order to facilitate a seamless attachment of the UE to the candidate DU.

Figure 2A:
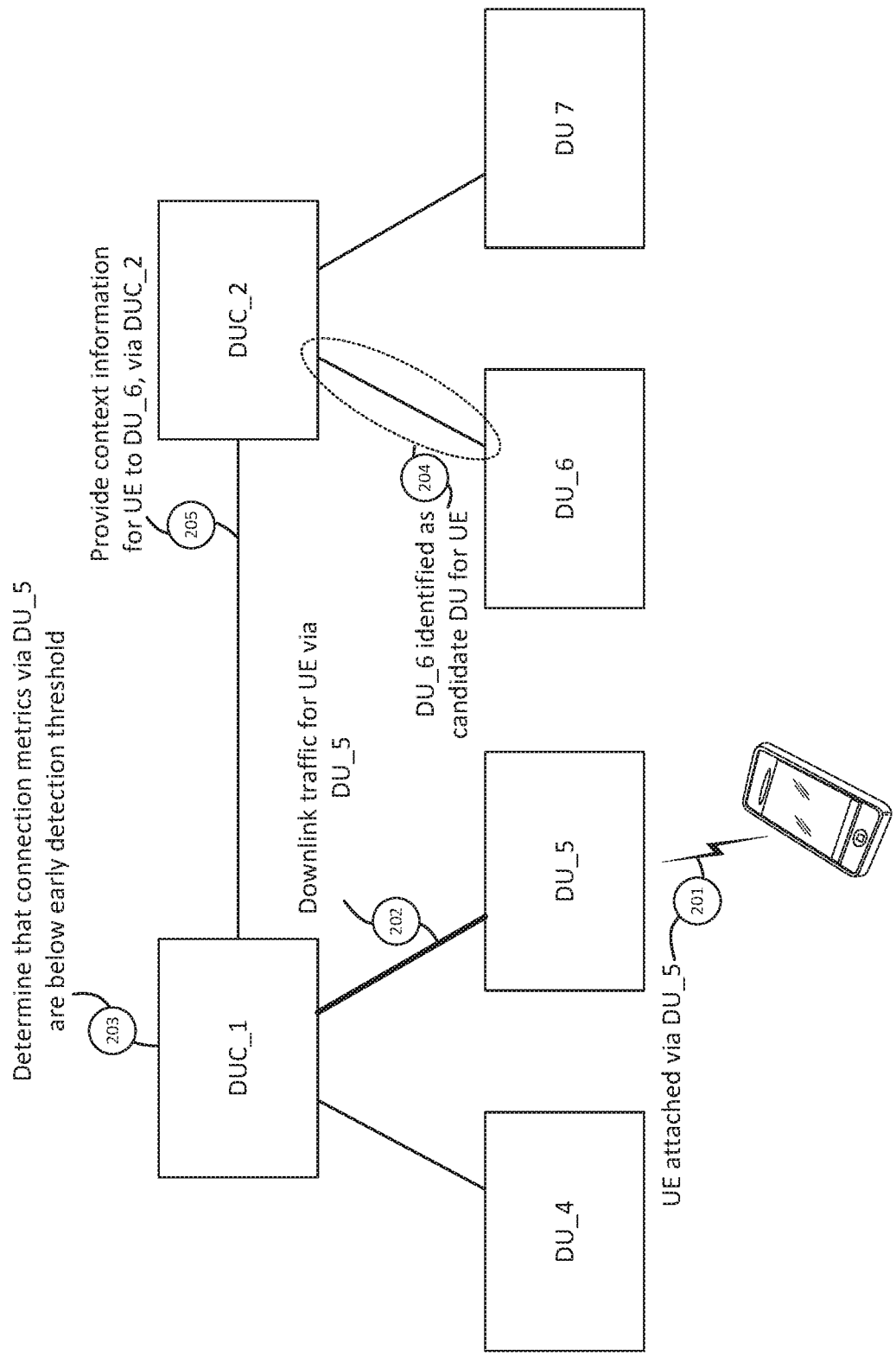
FIGS. 2A-2C illustrate an example overview of one or more embodiments described herein, in which a DU associated with a particular DU controller ("DUC") may be pre-loaded with context information in order to facilitate seamless communications with a UE that is currently attached to a DU associated with a different DUC.

For example, as shown in FIG. 2A, a UE may be attached (at 201) to a particular DU (i.e., DU_5 in this example). As shown, DU_5 may be communicatively coupled with DUC_1, and may receive traffic for the UE via DUC_1 (e.g., as denoted by the bolded line). As additionally shown, DUC_1 may be communicatively coupled (e.g., via an X2 interface or some other suitable interface) to DUC_2, which may be communicatively coupled to DU_6 and DU_7. At some point, DUC_1 may determine (at 203) that connection metrics between the UE and DU_5 and/or load metrics of DU_5 exceed an early detection threshold (e.g., as similarly described above with respect to FIG. 1A).

DUC_1 may determine (at 204) that DU_6 is a candidate for attachment to the UE. For example, as similarly described above, DUC_1 may determine that a signal strength between the UE and DU_6 is relatively strong (e.g., stronger than a signal strength between the UE and DU_5, is above a threshold signal strength, etc.). As another example, DUC_1 may determine that a coverage area of DU_6 is closer to a geographical location of the UE than a coverage area of DU_5, and/or that the UE is traveling on a path that is exiting the coverage area of DU_5 and/or entering the coverage area of DU_6. As yet another example, DUC_1 may determine that DU_6 has more available resources and/or lower load than DU_5, and/or that DU_6 has available resources that exceed a threshold amount of available resources. In some embodiments, DUC_1 may communicate with DUC_2 in order to determine information regarding DU_6 (e.g., to determine capacity and/or load of DU_6, or the like). In some embodiments, DUC_1 may receive measurement reports from the UE, indicating a signal strength between the UE and DU_5 and/or DU_6. In some embodiments, DUC_1 may receive measurement reports from DU_5 and/or DU_6 (e.g., via DUC_2), indicating a signal strength and/or other metrics between the UE and DU_5 and/or DU_6, respectively.

Figure 2B:
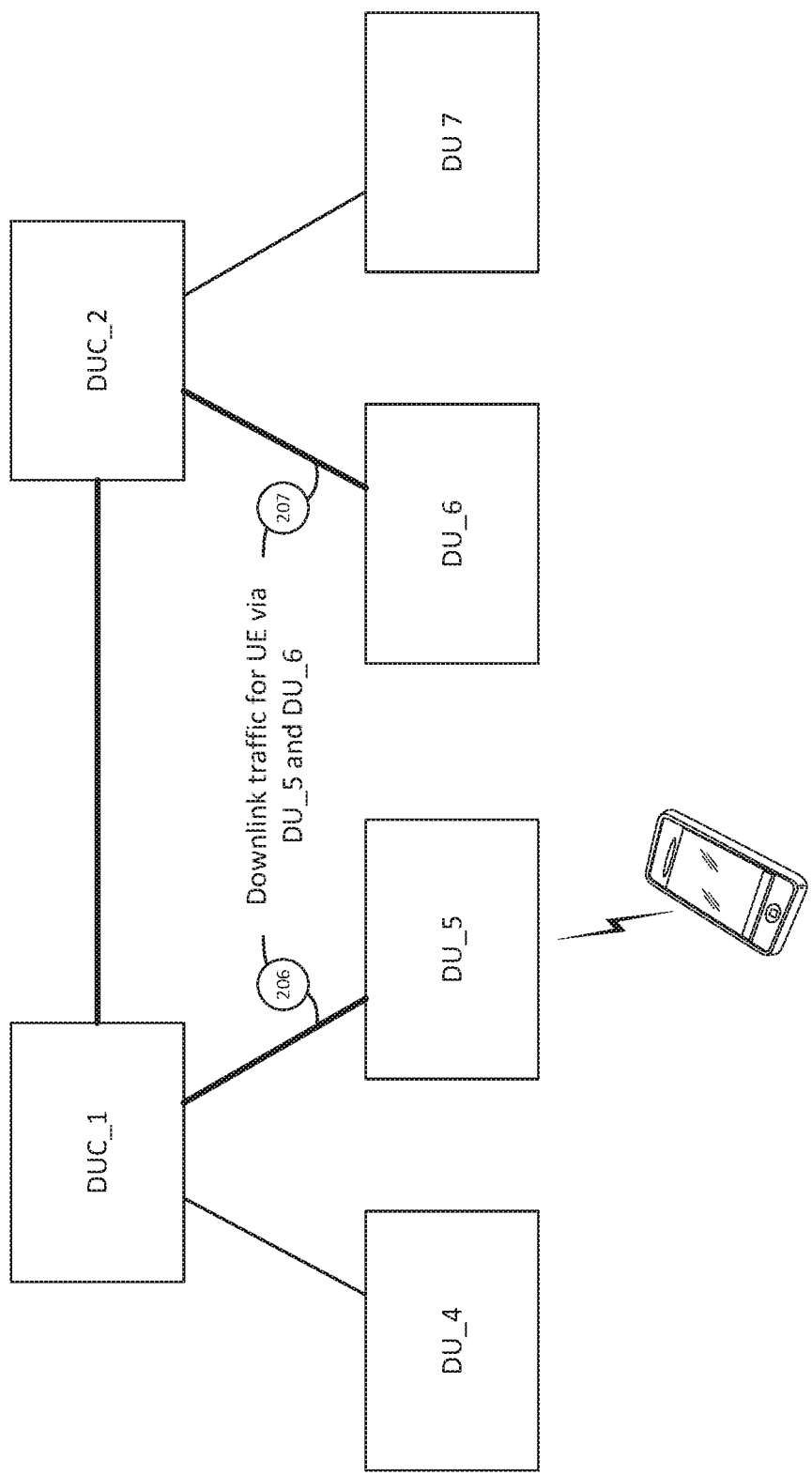

Based on determining that DU_6 is a candidate DU for attachment to the UE, DUC_1 may provide context information, for the UE, to DU_6 (e.g., via DUC_2). As similarly discussed above, DUC_1 may continue providing up-to-date context information, for the UE, to both DU_5 and DU_6. Additionally, as shown in FIG. 2B, DUC_1 may provide (at 206 and 207) traffic for the UE via DU_5 and DU_6, respectively. That is, the traffic for the UE may be provided to DU_5 and DU_6 simultaneously, or substantially simultaneously.

Figure 2C:
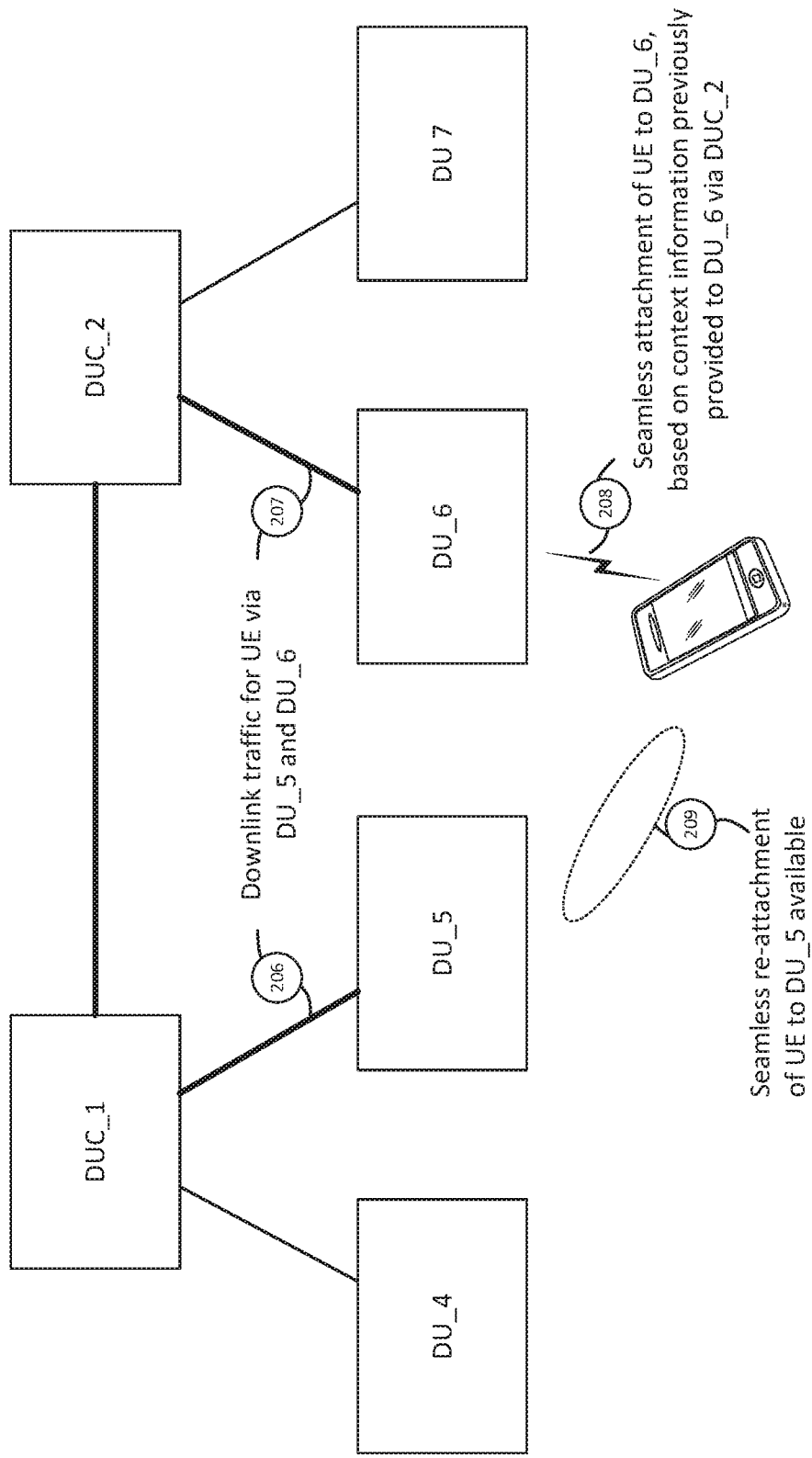

As shown in FIG. 2C, the UE may attach (at 208) to DU_6. For example, the UE may attach to DU_6 based on an instruction (e.g., from DUC_1 or DUC_2), and/or autonomously (e.g., based on searching for a DU to which to attach). As DU_6 has been "pre-loaded" with context information for UE, and is receiving traffic for the UE, the attachment of the UE to DU_6 may be seamless. That is, the UE may experience minimal or no interruption in the reception of data when attaching to DU_6 in lieu of DU_5. Further, DUC_1 may continue to provide traffic and up-to-date context information to DU_5 after the UE has attached to DU_6, to allow (at 209) the seamless reattachment of the UE to DU_5.

Figure 3A:
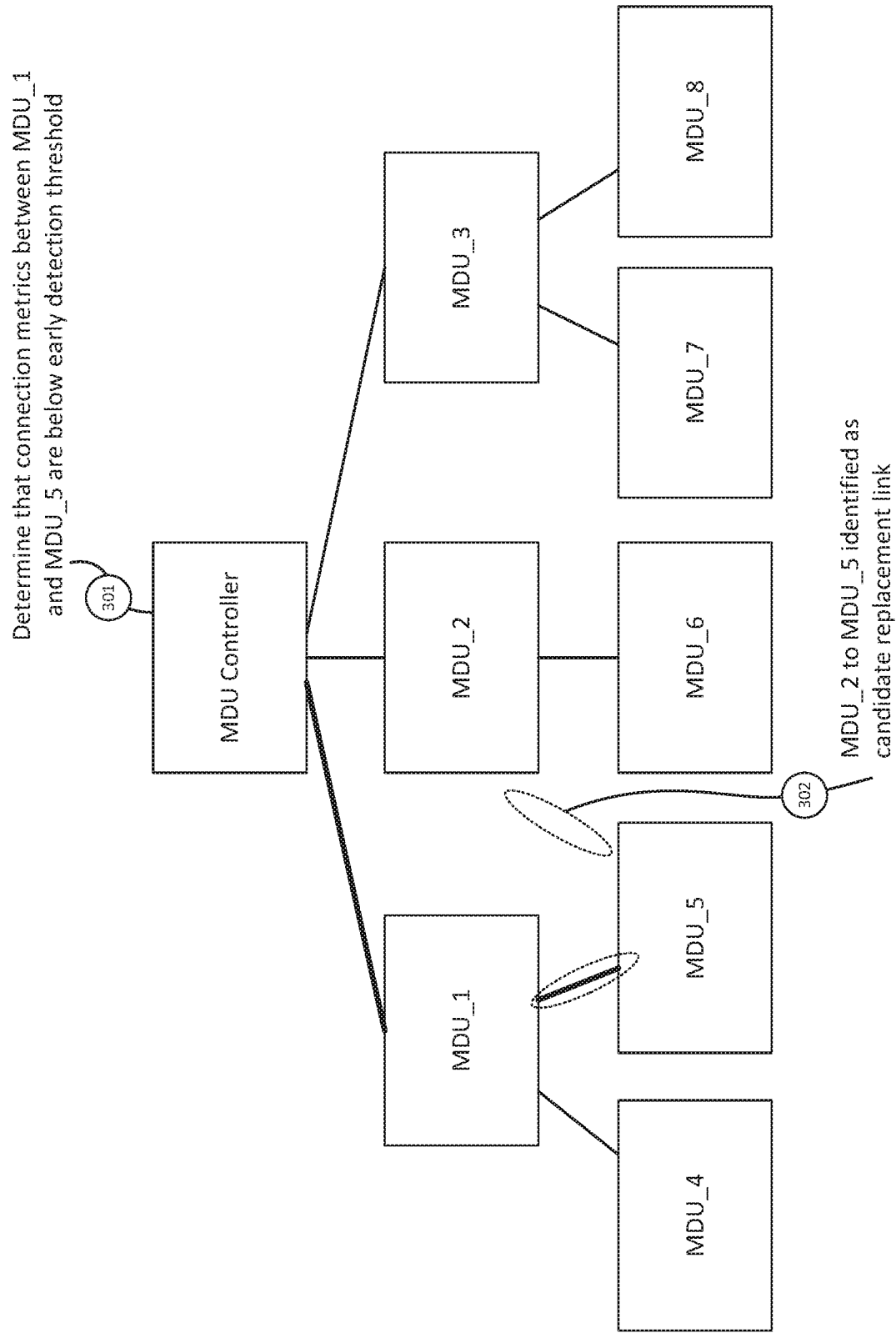
FIGS. 3A and 3B illustrate an example overview of one or more embodiments described herein, in which pre-loading context information may facilitate a seamless reorganization of a mesh of mesh DUs ("MDUs")

In some embodiments, DUs may be deployed in a "mesh" topology, in which one DU provides backhaul functionality for another DU in a wireless manner. For example, as shown in FIG. 3A, a set of mesh DUs ("MDUs," such as MDU_1 through MDU_8) may be deployed in a mesh topology. As shown, MDU_1 may provide backhaul functionality for MDU_4 and MDU_5. For instance, a UE that attaches to MDU_5 (or to another DU or MDU that is communicatively coupled to MDU_5) may communicate with MDU_5 via an RF interface. MDU_5 may provide uplink traffic, received from the UE, to MDU_1 via an RF interface. Further, MDU_1 may provide the uplink traffic, received from the UE, to an MDU controller (e.g., where the MDU controller is communicatively coupled to MDU_1, MDU_2, and MDU_3 in this example). The MDU controller may forward the traffic to a core network (e.g., via an optical or other "wired" interface). Similarly, the MDU controller may receive traffic for the UE from the core network, and may forward the traffic to the UE via MDU_1 and MDU_5.

In order to maintain the mesh topology, the MDU controller and/or MDU_1 may maintain context information for MDU_5. At some point, the MDU controller may determine (at 301) that connection metrics between MDU_1 and MDU_5 exceed an early detection threshold, and/or that load metrics associated with MDU_1 exceed an early detection threshold. Further, the MDU controller may identify (at 302) MDU_2 as a candidate MDU for attachment to MDU_5 (e.g., that an MDU_2-to-MDU_5 link is a candidate replacement for the MDU_1-to-MDU_5 link).

Figure 3B:
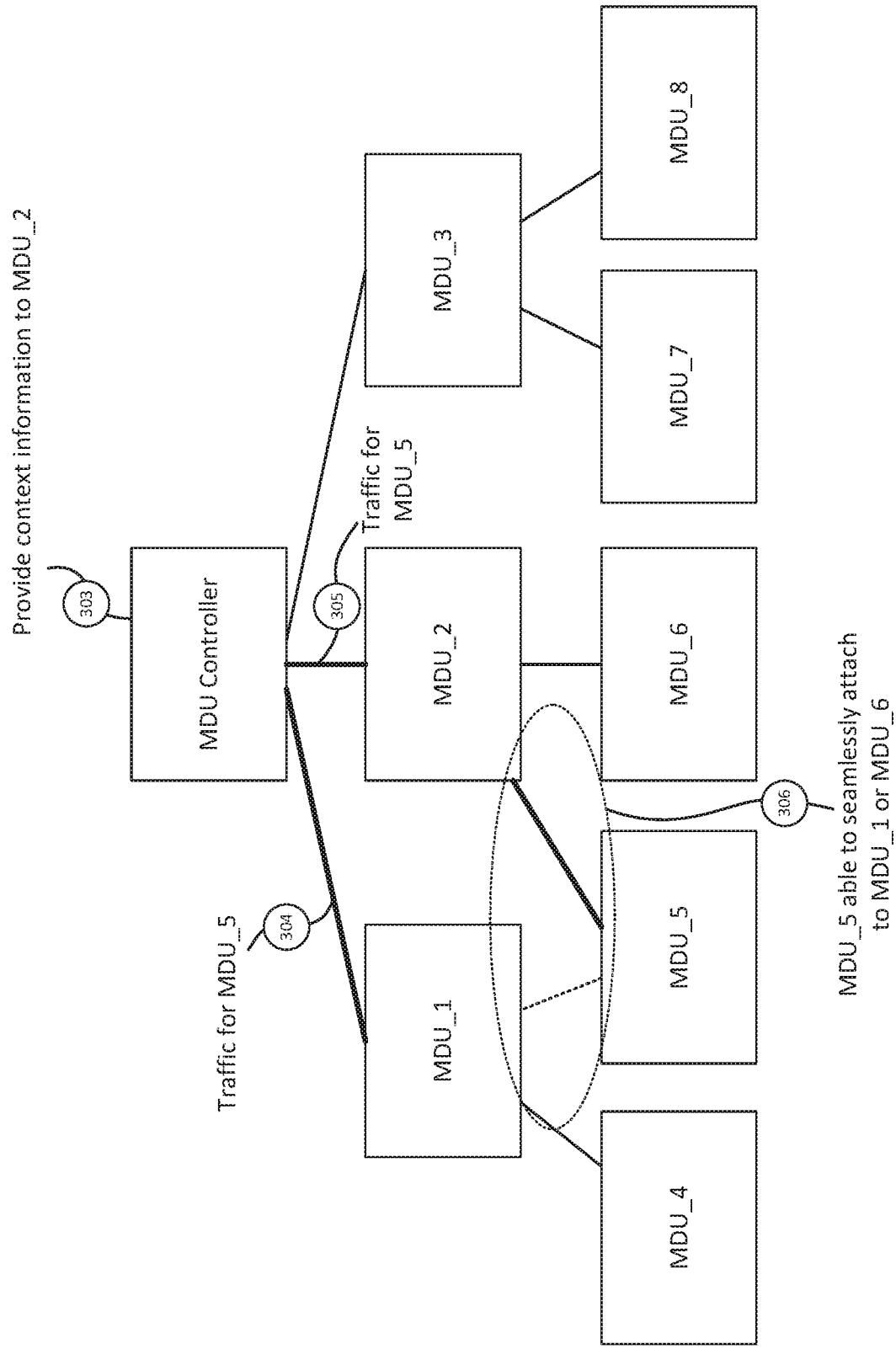

As shown in FIG. 3B, based on determining that MDU_2 is a candidate MDU for attachment to MDU_5, the MDU controller may provide (at 303) context information, for MDU_5, to MDU_2. Additionally, the MDU controller may provide (at 304 and 305) traffic (as well as up-to-date context information) for MDU_5 to MDU_1 and MDU_2, respectively. The traffic may be provided to MDU_1 and MDU_2 simultaneously, or substantially simultaneously.

At some point, MDU_5 may attach (at 306) to MDU_2 (e.g., a link in the mesh topology may be established between MDU_2 and MDU_5), in lieu of to MDU_1. For instance, MDU_5 may autonomously attach to MDU_2, and/or may be instructed (e.g., by the MDU controller) to attach to MDU_2 (e.g., based on a second threshold that is different from the early detection threshold). Since MDU_2 has been "pre-loaded" with up-to-date context information and traffic for MDU_5, the attachment of MDU_5 to MDU_2 may result in minimal or zero interruption in the providing of traffic to MDU_5.

While described above in the context of one DU being selected as a candidate DU for attachment to a UE, similar concepts may be applied to identify multiple DUs as candidate DUs for attachment to a UE. For example, the UE may be attached to one DU, and may be in communication range (e.g., within a coverage area) of two other DUs. In some scenarios, the DUC may identify both of the other DUs as candidate DUs, and may provide the context information and traffic to the other DUs, in addition to the DU to which the UE is presently attached. Similarly, while described above in the context of one MDU being selected as a candidate MDU for attachment to another MDU, similar concepts may be applied to identify multiple MDUs as candidate MDUs.

Figure 4A:
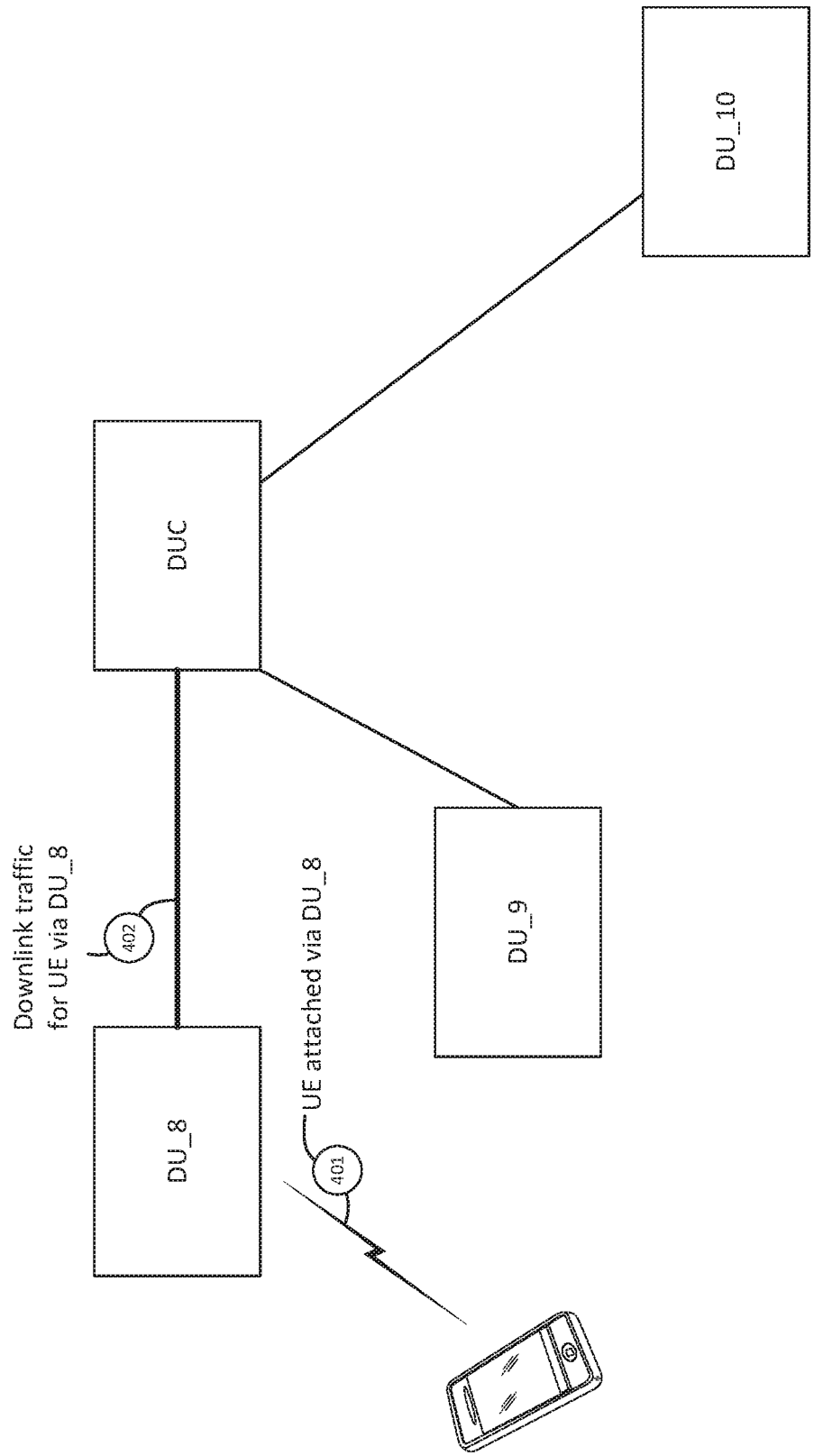
FIGS. 4A and 4B illustrate an example in which a context, associated with communications between a UE and a DU, is not provided to another DU prior to attachment of the UE to the other DU.
Figure 4B:
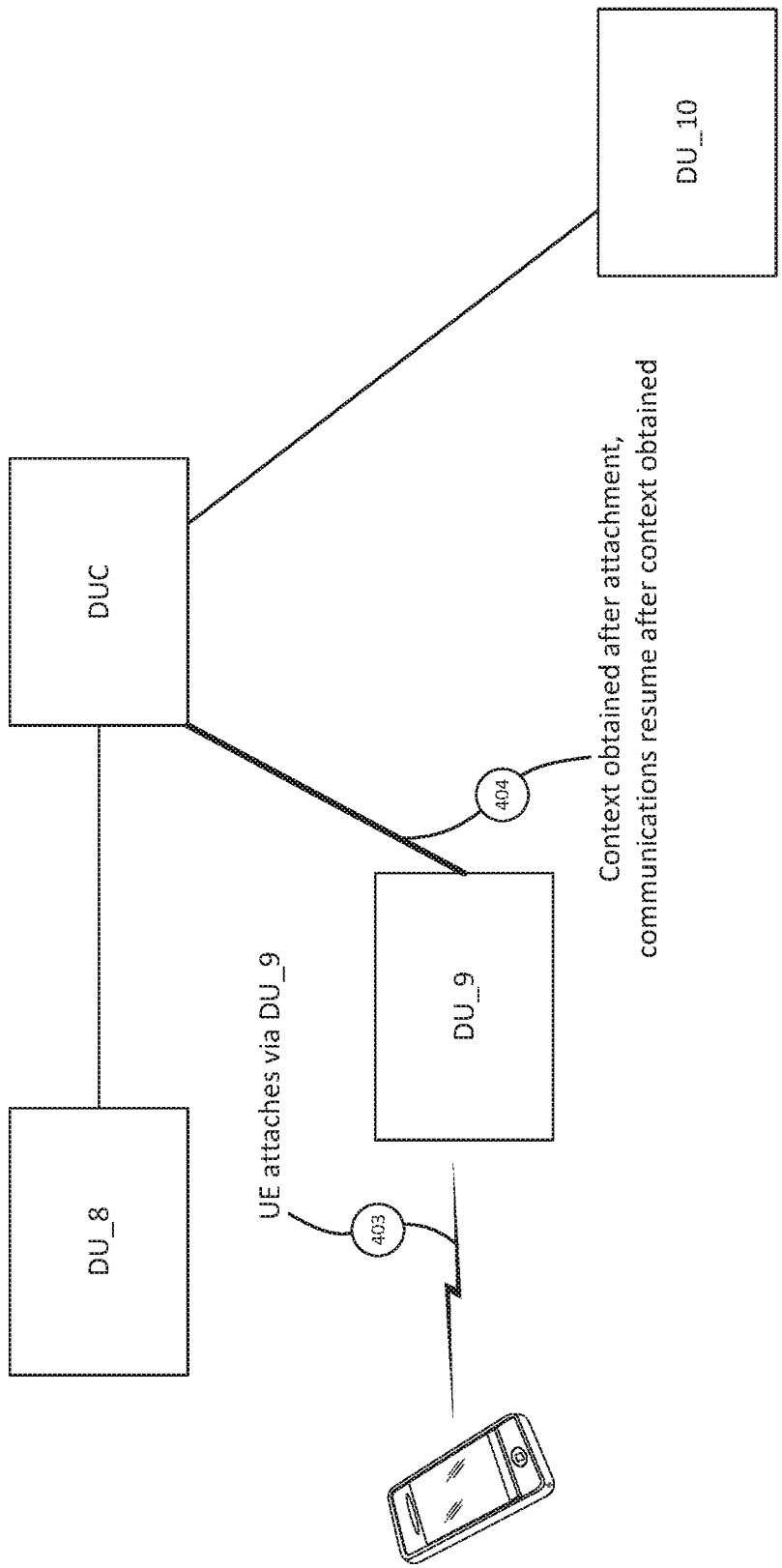

FIGS. 4A and 4B illustrate a situation in which context information for a UE may be provided to a DU after the UE attaches to the DU (e.g., participates in a handover from another DU). As shown in FIG. 4A, a UE may be attached (at 401) to DU_8. As such, a DUC may provide traffic and context information for the UE to DU_8. As shown in FIG. 4B, the UE may attach (at 403) to DU_9. After the UE attaches to DU_9, the DUC may provide (at 404) context information, as well as traffic for the UE, to DU_9. The providing of traffic and up-to-date context information to DU_9, after the UE attaches to DU_9, may result in an interruption of service while the context information and traffic are initially provided to DU_9.

Figure 5:
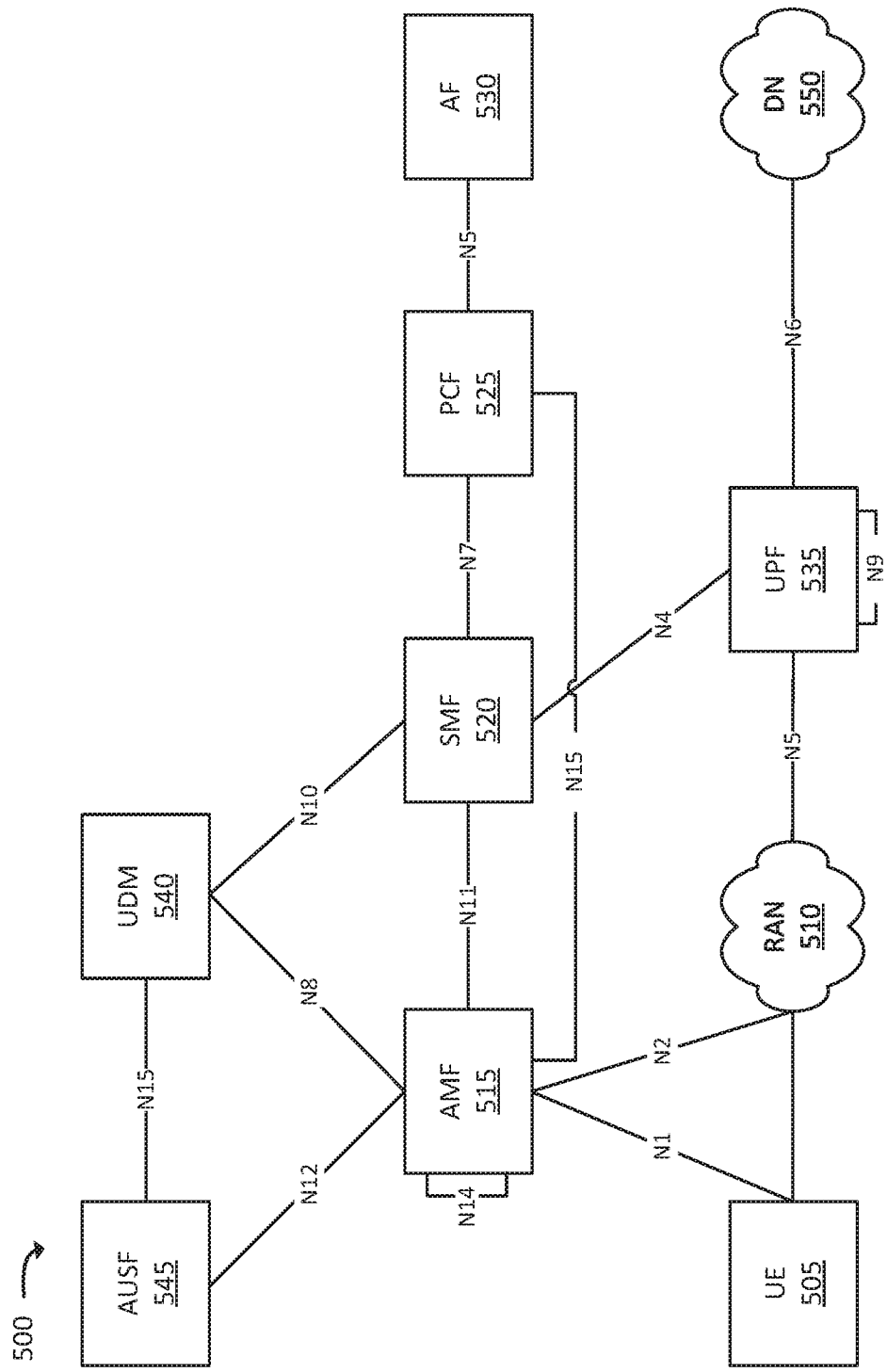
FIG. 5 illustrates an example environment in which one or more embodiments, described herein, may be implemented.

FIG. 5 illustrates an example environment 500 in which one or more embodiments may be implemented. In some embodiments, environment 500 may correspond to a Fifth Generation ("5G") network, and/or may include elements of a 5G network. As shown, environment 500 may include UE 505, RAN 510, Access and Mobility Management Function ("AMP") 515, SMF 520, Policy Control Function ("PCF") 525, Application Function ("AF") 530, User Plane Function ("UPF") 535, Unified Data Management ("UDM") 540, Authentication Server Function ("AUSF") 545, and Data Network ("DN") 550.

The quantity of devices and/or networks, illustrated in FIG. 5, is provided for explanatory purposes only. In practice, environment 500 may include additional devices and/or networks, fewer devices and/or networks, different devices and/or networks, or differently arranged devices and/or networks than illustrated in FIG. 5. For example, while not shown, environment 500 may include devices that facilitate or enable communication between various components shown in environment 500, such as routers, modems, gateways, switches, hubs, etc. Alternatively, or additionally, one or more of the devices of environment 500 may perform one or more functions described as being performed by another one or more of the devices of environment 500. Devices of environment 500 may interconnect with each other and/or other devices via wired connections, wireless connections, or a combination of wired and wireless connections. In some implementations, one or more devices of environment 500 may be physically integrated in, and/or may be physically attached to, one or more other devices of environment 500.

UE 505 may include a computation and communication device, such as a wireless mobile communication device that is capable of communicating with RAN 510 and/or DN 550. UE 505 may be, or may include, a radiotelephone, a personal communications system ("PCS") terminal (e.g., a device that combines a cellular radiotelephone with data processing and data communications capabilities), a personal digital assistant ("PDA") (e.g., a device that may include a radiotelephone, a pager, Internet/intranet access, etc.), a smart phone, a laptop computer, a tablet computer, a camera, a personal gaming system, an IoT device (e.g., a sensor, a smart home appliance, or the like), a wearable device, a Mobile-to-Mobile ("M2M") device, or another type of mobile computation and communication device. UE 505 may send traffic to and/or receive traffic (e.g., user plane traffic) from DN 550 via RAN 510 and UPF 535.

RAN 510 may be, or may include, a 5G RAN that includes one or more base stations, via which UE 505 may communicate with one or more other elements of environment 500. UE 505 may communicate with RAN 510 via an air interface. For instance, RAN 510 may receive traffic (e.g., voice call traffic, data traffic, messaging traffic, signaling traffic, etc.) from UE 505 via the air interface, and may communicate the traffic to UPF 535, and/or one or more other devices or networks. Similarly, RAN 510 may receive traffic intended for UE 505 (e.g., from UPF 535, AMF 515, and/or one or more other devices or networks) and may communicate the traffic to UE 505 via the air interface.

Figure 6:
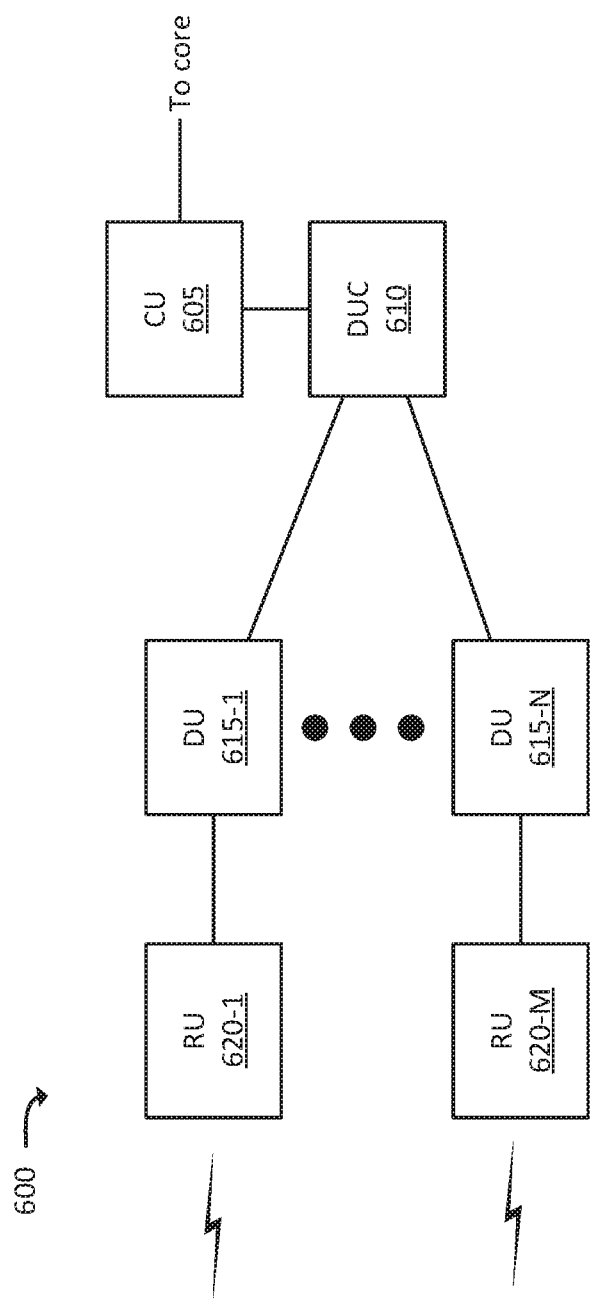
FIG. 6 illustrates an example arrangement of components of a radio access network ("RAN"), in accordance with some embodiments described herein.

FIG. 6 illustrates an example RAN 600, which may be an example of RAN 510, and/or may depict example components of RAN 510, in accordance with some embodiments. As shown, RAN 600 may include Central Unit ("CU") 605, DUC 610, one or more DUs 615-1 through 615-N (referred to individually as "DU 615," or collectively as "DUs 615"), and one or more Remote Units ("RUs") 620-1 through 620-M (referred to individually as "RU 620," or collectively as "RUs 620").

CU 605 communicate with a core (e.g., may communicate with one or more of the devices or systems described with respect to FIG. 5, such as AMF 515 and/or UPF 535) of a wireless network. In the uplink direction (e.g., for traffic from UEs 505 to the core network), CU 605 may aggregate traffic from DUs 615, and forward the aggregated traffic to the core network. In some embodiments, CU 605 may receive traffic according to a given protocol (e.g., RLC) from DUs 615, and may perform higher-layer processing (e.g., may aggregate/process RLC packets and generate PDCP packets based on the RLC packets) on the traffic received from DUs 615. In the downlink direction (e.g., for traffic from the core network for one or more UEs 505), CU 605 may determine which DU 615, or which DUs 615, to which the traffic should be provided.

In accordance with some embodiments, CU 605 may communicate with DUC 610 to determine which DU(s) 615 should receive downlink traffic for a given UE 505. In some embodiments, 605 may provide downlink traffic, for a given UE 505, to DUC 610. As similarly described above, DUC 610 may determine which DU(s) 615 to which to provide the traffic. For example, DUC 610 may provide the traffic, for a particular UE 505, to multiple DUs 615. CU 605 and/or DUC 610 may maintain context information (e.g., RLC sequence numbers, PDCP sequence numbers, and/or other suitable context information) in order to facilitate the providing of traffic to UEs 505 from the core network, and vice versa. In some embodiments, CU 605 may provide up-to-date context information to DUC 610, which may distribute the up-to-date context information in the manner described above.

In some embodiments, CU 605 and DUC 610 may be implemented by the same device and/or system (e.g., a device or system that performs some or all of the functionality described above with respect to CU 605 and DUC 610). In some embodiments, CU 605 and DUC 610 may be implemented distinct devices and/or systems, which are in communication with each other in order to facilitate the functionality described above. While not explicitly illustrated in FIG. 6, DUC 610 may be communicatively coupled to the core network (e.g., in addition to, or in lieu of, CU 605 being communicatively coupled to the core network).

DU 615 may include one or more devices that receive traffic from the core network (e.g., via CU 605 and/or DUC 610), and provide the traffic to UE 505 (e.g., via a respective RU 620). DU 615 may, for example, receive traffic from RU 620 at a first layer (e.g., PHY layer traffic, or lower PHY layer traffic), and may process/aggregate the traffic to a second layer (e.g., upper PHY and/or RLC). DU 615 may receive traffic from CU 605 and/or DUC 610 at the second layer, may process the traffic to the first layer, and provide the processed traffic to a respective RU 620 for transmission to UE 505.

RU 620 may include hardware circuitry (e.g., one or more RF transceivers, antennas, radios, and/or other suitable hardware) to communicate wirelessly (e.g., via an RF interface) with one or more UEs 505. In the uplink direction, RU 620 may receive traffic from UE 505 via the RF interface, and may provide the traffic to DU 615. In the downlink direction, RU 620 may receive traffic from UE 505 from DU 615, and may provide the traffic to UE 505.

In some embodiments, one or more DUs may be configured as an MDU. In such scenarios, a first DU 615 may, via a first RU 620, attach to a second DU 615 via a second RU 620. As discussed above, when configured as MDUs, DUs 615 may perform backhaul functionality (e.g., transporting traffic, at the PDCP layer and/or the RLC layer, from the core network (e.g., as received from CU 605 or DUC 610) to UE 505, and/or vice versa). In some such embodiments, DUC 610 may be configured as an MDU controller, which receives backhaul traffic to from the MDUs (e.g., as RLC traffic), aggregates and processes the backhaul traffic (e.g., into PDCP traffic and/or some higher layer), and provides the aggregated backhaul traffic to the core network. Similarly, DUC 610 may receive traffic from the core network, which is destined for a particular MDU, and may forward the traffic (e.g., as RLC traffic) to the particular MDU (e.g., via one or more other MDUs).

Returning to FIG. 5, AMF 515 may include one or more computation and communication devices that perform operations to register UE 505 with the 5G network, to establish bearer channels associated with a session with UE 505, to hand off UE 505 from the 5G network to another network, to hand off UE 505 from the other network to the 5G network, and/or to perform other operations. In some embodiments, the 5G network may include multiple AMFs 515, which communicate with each other via the N14 interface (denoted in FIG. 5 by the line marked "N14" originating and terminating at AMF 515).

SWF 520 may include one or more network devices that gather, process, store, and/or provide information in a manner described herein. SMF 520 may, for example, facilitate in the establishment of communication sessions on behalf of UE 505. In some embodiments, the establishment of communications sessions may be performed in accordance with one or more policies provided by PCF 525. In some embodiments, SMF 520 may be provisioned or configured to intercept some or all control messages associated with UE 505 (e.g., based on an intercept request), and provide the intercepted messages to some other system or device.

PCF 525 may include one or more devices that aggregate information to and from the 5G network and/or other sources. PCF 525 may receive information regarding policies and/or subscriptions from one or more sources, such as subscriber databases and/or from one or more users (such as, for example, an administrator associated with PCF 525).

AF 530 may include one or more devices, systems, Virtualized Network Functions ("VNFs"), etc., that receive, store, and/or provide information that may be used in determining parameters (e.g., quality of service parameters, charging parameters, or the like) for certain applications.

UPF 535 may include one or more devices, systems, VNFs, etc., that receive, store, and/or provide data (e.g., user plane data). For example, UPF 535 may receive user plane data (e.g., voice call traffic, data traffic, etc.), destined for UE 505, from DN 550, and may forward the user plane data toward UE 505 (e.g., via RAN 510, SMF 520, and/or one or more other devices). In some embodiments, multiple UPFs 535 may be deployed (e.g., in different geographical locations), and the delivery of content to UE 505 may be coordinated via the N9 interface (e.g., as denoted in FIG. 5 by the line marked "N9" originating and terminating at UPF 535). Similarly, UPF 535 may receive traffic from UE 505 (e.g., via RAN 510, SMF 520, and/or one or more other devices), and may forward the traffic toward DN 550. In some embodiments, UPF 535 may communicate (e.g., via the N4 interface) with SMF 520, regarding user plane data processed by UPF 535. In some embodiments, UPF 535 may be provisioned or configured to intercept some or all user plane traffic associated with UE 505 (e.g., based on an intercept request), and provide the intercepted traffic to some other system or device.

AUSF 545 and UDM 540 may include one or more devices, systems, VNFs, etc., that manage, update, and/or store, in one or more memory devices associated with AUSF 545 and/or UDM 540, profile information associated with a subscriber. AUSF 545 and/or UDM 540 may perform authentication, authorization, and/or accounting operations associated with the subscriber and/or a communication session with UE 505.

DN 550 may include one or more wired and/or wireless networks. For example, DN 550 may include an Internet Protocol ("IP")-based PDN, a wide area network ("WAN") such as the Internet, a private enterprise network, and/or one or more other networks. UE 505 may communicate, through DN 550, with data servers, other UEs 105, and/or to other servers or applications that are coupled to DN 550. DN 550 may be connected to one or more other networks, such as a public switched telephone network ("PSTN"), a public land mobile network ("PLMN"), and/or another network. DN 550 may be connected to one or more devices, such as content providers, applications, web servers, and/or other devices, with which UE 505 may communicate.

Figure 7:
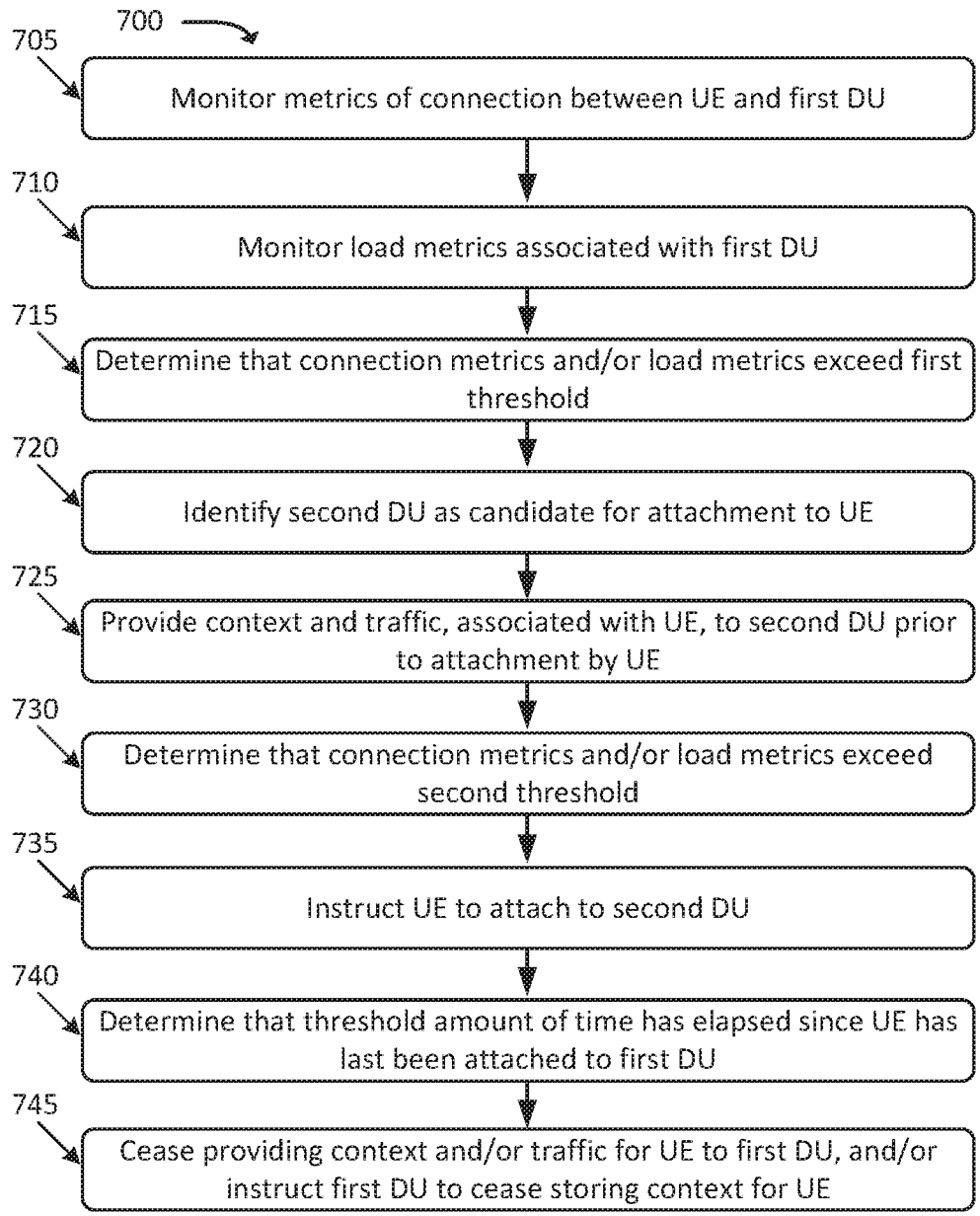
FIG. 7 illustrates an example process for facilitating seamless communications for a UE that attaches to a second DU after being attached to a first DU, in accordance with some embodiments.

FIG. 7 illustrates a process 700 for facilitating seamless communications for a UE that attaches to a second DU after being attached to a first DU, in accordance with embodiments described herein. In some embodiments, some or all of process 700 may be performed by DUC 610. In some embodiments, some or all of process 700 may be performed by one or more other suitable devices or systems, such as CU 605.

As shown, process 700 may include monitoring (at 705) metrics of a connection between a UE and a first DU. For instance, DUC 610 may receive measurement reports (e.g., from UE 505 and/or from DU 615), indicating connection metrics between UE 505 and DU 615. As discussed above, the connection metrics may indicate signal strength, throughput, latency, and/or other suitable metrics.

Process 700 may further include monitoring (at 710) load metrics associated with the first DU. For instance, DUC 610 may receive information (e.g., from DU 615 and/or some other device or system) indicating a measure of load and/or capacity associated with DU 615. For instance, the information may indicate a quantity of connections between DU 615 (e.g., via an associated RU 620) and one or more UEs 505, an amount of bandwidth used by UEs 505 attached to DU 615, an amount of available bandwidth associated with DU 615, and/or some other suitable measure of load and/or capacity of DU 615.

Process 700 may additionally include determining (at 715) that the connection metrics and/or the load metrics exceed a first threshold. For instance, DU 615 may detect that one or more the connection and/or load metrics exceed a first threshold. The term "exceeds," as used herein, may reflect that a given value is either above or below a threshold, as appropriate. For instance, in the context of signal strength, the first threshold may be "exceeded" when the signal strength is "below" the threshold. On the other hand, in the context of latency, the first threshold may be "exceeded" when the latency is "above" the threshold. In some embodiments, DUC 610 may generate a score (e.g., a normalized score, such as a score between 1-100 and/or some other scale) based on the connection metrics and/or the load metrics, and evaluate this score against the first threshold (e.g., where the first threshold is on the same scale as the normalized score). The first threshold may be an "early detection" threshold, in that the first threshold may not be used to trigger a handover of UE 505 to a different DU 615.

Process 700 may also include identifying (at 720) a second DU as a candidate for attachment to the UE. For example, based on determining that the connection metrics and/or load metrics (as discussed above) exceed the first threshold, DUC 610 may identify one or more other DUs 615 that may be suitable candidates to which UE 505 may attach. As discussed above, this determination may be based on signal strength between UE 505 and the second DU 615, proximity of UE 505 to a coverage area of the second DU 615, a heading and/or velocity of UE 505 with respect to the coverage area of the second DU 615, load and/or capacity of the second DU 615, and/or other suitable factors. As also mentioned above, DUC 610 may identify multiple DUs 615 as candidates for attachment to UE 505.

Process 700 may further include providing (at 725) context and traffic, associated with the UE, to the second DU prior to attachment by the UE. For example, as discussed above, DUC 610 may provide up-to-date context information and/or downlink traffic, for UE 505, to both the first and second DUs 615.

Process 700 may additionally include determining (at 730) that the connection metrics and/or the load metrics exceed a second threshold. For instance, in a scenario where the first threshold was "exceeded" by the signal strength between UE 505 and the first DU 615 being below the first threshold, the second threshold may be "exceeded" when the signal strength between UE 505 and the first DU 615 falls further, and is below the second threshold. As another example, in a scenario where the first threshold was "exceeded" by the latency of communications between UE 505 and the first DU 615 being higher than the first threshold, the second threshold may be "exceeded" when the latency becomes even higher, and is above the second threshold. In situations where a score is generated and evaluated against the first and second thresholds, the second threshold may be higher than the first threshold (e.g., when the thresholds are considered as "exceeded" when the score is higher than the thresholds), or the second threshold may be lower than the first threshold (e.g., when the thresholds are considered as "exceeded" when the score is lower than the threshold).

Process 700 may also include instructing (at 735) the UE to attach to the second DU. For instance, based on determining that the second threshold has been exceeded, DUC 610 may instruct UE 505 to attach to the second DU 615. In some embodiments, in lieu of blocks 730 and/or 735, UE 505 may "autonomously" (e.g., without an instruction from DUC 610) attach to the second DU 615.

Process 700 may further include determining (at 740) that a threshold amount of time has elapsed since the UE has last been attached to the first DU. For example, as discussed above, DUC 610 may continue to provide up-to-date context information and/or traffic for UE 505 to the first DU 615.

This may be done in case UE 505 reattaches to the first DU 615. After a threshold amount of time, it may become unlikely that UE 505 will reattach to the first DU 615 (and/or will reattach to the first DU 615 in the relatively near future).

Process 700 may additionally include ceasing (at 745) providing context information and/or traffic for the UE to the first DU, and/or instructing the first DU to cease storing context information for the UE. For example, once the threshold time has elapsed (at 740), DUC 610 may cease providing up-to-date context information and/or traffic for UE 505 to the first DU 615. In some embodiments, DUC 610 may instruct DU 615 to free up memory, processing, and/or network resources that were used to maintain the context and/or traffic for UE 505.

Figure 8:
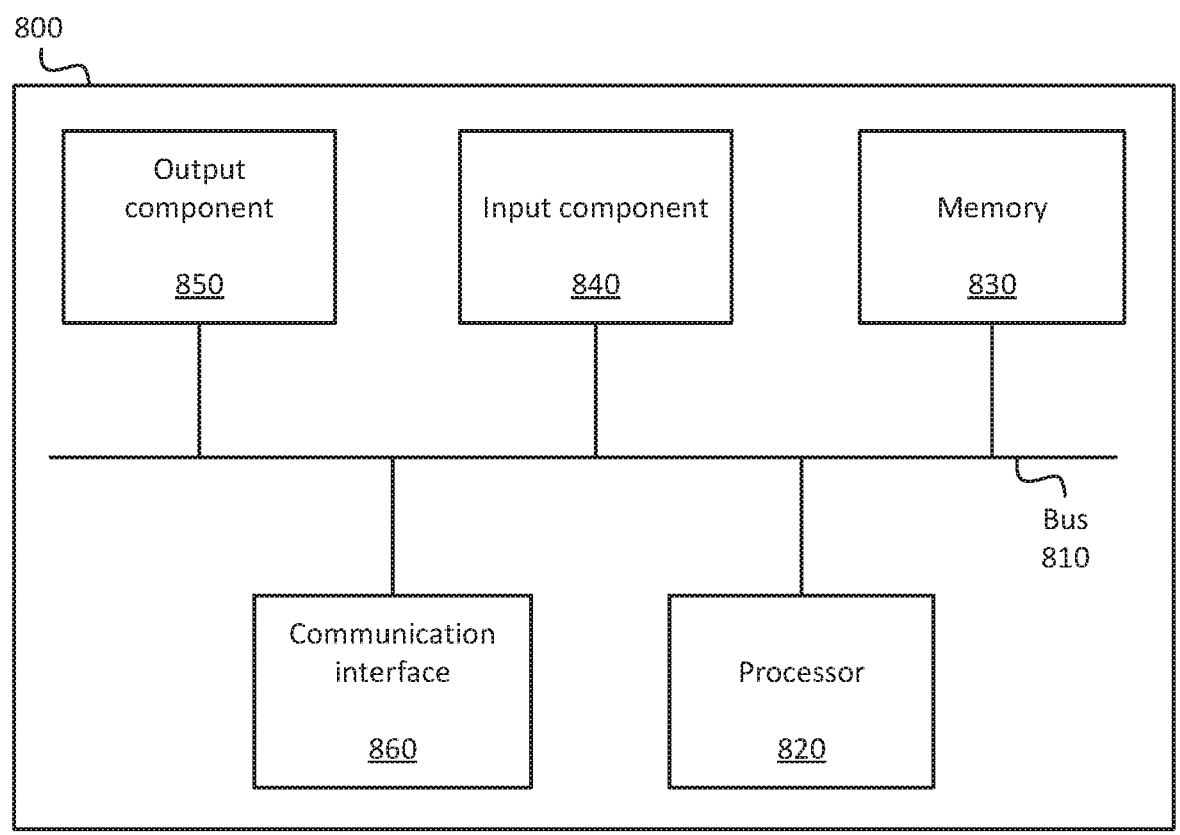
FIG. 8 illustrates example functional components of one or more devices, in accordance with one or more embodiments described herein.

FIG. 8 illustrates example components of device 800. One or more of the devices described above may include one or more devices 800. Device 800 may include bus 810, processor 820, memory 830, input component 840, output component 850, and communication interface 860. In another implementation, device 800 may include additional, fewer, different, or differently arranged components.

Bus 810 may include one or more communication paths that permit communication among the components of device 800. Processor 820 may include a processor, microprocessor, or processing logic that may interpret and execute instructions. Memory 830 may include any type of dynamic storage device that may store information and instructions for execution by processor 820, and/or any type of non-volatile storage device that may store information for use by processor 820.

Input component 840 may include a mechanism that permits an operator to input information to device 800, such as a keyboard, a keypad, a button, a switch, etc. Output component 850 may include a mechanism that outputs information to the operator, such as a display, a speaker, one or more light emitting diodes ("LEDs"), etc.

Communication interface 860 may include any transceiver-like mechanism that enables device 800 to communicate with other devices and/or systems. For example, communication interface 860 may include an Ethernet interface, an optical interface, a coaxial interface, or the like. Communication interface 860 may include a wireless communication device, such as an infrared ("IR") receiver, a Bluetooth® radio, or the like. The wireless communication device may be coupled to an external device, such as a remote control, a wireless keyboard, a mobile telephone, etc. In some embodiments, device 800 may include more than one communication interface 860. For instance, device 800 may include an optical interface and an Ethernet interface.

Device 800 may perform certain operations relating to one or more processes described above. Device 800 may perform these operations in response to processor 820 executing software instructions stored in a computer-readable medium, such as memory 830. A computer-readable medium may be defined as a non-transitory memory device. A memory device may include space within a single physical memory device or spread across multiple physical memory devices. The software instructions may be read into memory 830 from another computer-readable medium or from another device. The software instructions stored in memory 830 may cause processor 820 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations.

For example, while series of blocks and/or signals have been described with regard to FIGS. 1A-4B and 7, the order of the blocks and/or signals may be modified in other implementations. Further, non-dependent blocks and/or signals may be performed in parallel. Additionally, while the figures have been described in the context of particular devices performing particular acts, in practice, one or more other devices may perform some or all of these acts in lieu of, or in addition to, the above-mentioned devices.

The actual software code or specialized control hardware used to implement an embodiment is not limiting of the embodiment. Thus, the operation and behavior of the embodiment has been described without reference to the specific software code, it being understood that software and control hardware may be designed based on the description herein.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown, in practice, additional, fewer, or different, connections or devices may be used. Furthermore, while various devices and networks are shown separately, in practice, the functionality of multiple devices may be performed by a single device, or the functionality of one device may be performed by multiple devices. Further, multiple ones of the illustrated networks may be included in a single network, or a particular network may include multiple networks. Further, while some devices are shown as communicating with a network, some such devices may be incorporated, in whole or in part, as a part of the network.

To the extent the aforementioned implementations collect, store, or employ personal information provided by individuals, it should be understood that such information shall be collected, stored, and used in accordance with all applicable laws concerning protection of personal information. Additionally, the collection, storage, and use of such information may be subject to consent of the individual to such activity (for example, through "opt-in" or "opt-out" processes, as may be appropriate for the situation and type of information). Storage and use of personal information may be in an appropriately secure manner reflective of the type of information, for example, through various encryption and anonymization techniques for particularly sensitive information.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A device, comprising:
a non-transitory computer-readable medium storing a set of processor-executable instructions; and
one or more processors configured to execute the set of processor-executable instructions, wherein executing the set of processor-executable instructions causes the one or more processors to:
identify, for a User Equipment ("UE") that receives wireless connectivity to a wireless network via attachment to a first Distributed Unit ("DU") of the wireless network, a second DU that is a candidate for attachment to the UE;
provide, to the second DU and prior to attachment of the UE to the second DU, context information for traffic associated with the UE;
determine, after providing the context information to the second DU, that the UE should attach to the second DU;
instruct, based on determining that the UE should attach to the second DU, the UE to attach to the second DU, wherein the second DU uses the context information to seamlessly continue to provide wireless connectivity to the UE;
simultaneously provide, after the UE attaches to the second DU, updated context information and traffic for the UE to the first DU and the second DU;
track an amount of time that has passed since the UE last attached to the first DU;
determine, based on the tracking, that at least a threshold amount of time has passed since the UE last attached to the first DU; and
based on determining that at least the threshold amount of time has passed since the UE last attached to the first DU, cease providing the updated context information to the first DU.

2. The device of claim 1, wherein the context information includes one or more sequence numbers.

3. The device of claim 2, wherein the one or more sequence numbers include one or more Radio Link Control ("RLC") sequence numbers.

4. The device of claim 1, wherein executing the set of processor-executable instructions further causes the one or more processors to:
simultaneously provide the same context information to the first DU and the second DU prior to the UE attaching to the second DU.

5. The device of claim 1, wherein executing the set of processor-executable instructions further causes the one or more processors to:
receive traffic, from the wireless network, for the UE; and
simultaneously output the traffic, for the UE, to the first DU and the second DU, prior to attachment by the UE to the second DU.

6. The device of claim 1, wherein executing the set of processor-executable instructions further causes the one or more processors to:
monitor a wireless connection between the UE and the first DU to determine a first measure of quality of the wireless connection;
determine that the first measure of quality of the wireless connection between the UE and the first DU exceeds a first threshold but does not exceed a second threshold, wherein the identification of the second DU as a candidate for attachment is performed based on the determination that the first measure of quality of the wireless connection between the UE and the first DU exceeds the first threshold;
continue to monitor the wireless connection between the UE and the first DU to determine a second measure of quality of the wireless connection; and
determine that the second measure of quality of the wireless connection between the UE and the first DU exceeds the second threshold, wherein the determination that the UE should attach to the second DU is based on the determination that the second measure of quality of the wireless connection between the UE and the first DU exceeds the second threshold.

7. The device of claim 1, wherein executing the processor-executable instructions further causes the one or more processors to:
continue providing context information for traffic associated with the UE to the first DU after attachment of the UE to the second DU.

8. A non-transitory computer-readable medium, storing a plurality of processor-executable instructions, which, when executed by one or more processors, causes the one or more processors to:
identify, for a User Equipment ("UE") that receives wireless connectivity to a wireless network via attachment to a first Distributed Unit ("DU") of the wireless network, a second DU that is a candidate for attachment to the UE;
provide, to the second DU and prior to attachment of the UE to the second DU, context information for traffic associated with the UE;
determine, after providing the context information to the second DU, that the UE should attach to the second DU;
instruct, based on determining that the UE should attach to the second DU, the UE to attach to the second DU, wherein the second DU uses the context information to seamlessly continue to provide wireless connectivity to the UE;
simultaneously provide, after the UE attaches to the second DU, updated context information and traffic for the UE to the first DU and the second DU;
track an amount of time that has passed since the UE last attached to the first DU;
determine, based on the tracking, that at least a threshold amount of time has passed since the UE last attached to the first DU; and
based on determining that at least the threshold amount of time has passed since the UE last attached to the first DU, cease providing the updated context information to the first DU.

9. The non-transitory computer-readable medium of claim 8, wherein the context information includes one or more sequence numbers.

10. The non-transitory computer-readable medium of claim 9, wherein the one or more sequence numbers include one or more Radio Link Control ("RLC") sequence numbers.

11. The non-transitory computer-readable medium of claim 8, wherein execution of the processor-executable instructions further causes the one or more processors to:

simultaneously provide the same context information to the first DU and the second DU prior to the UE attaching to the second DU.

12. The non-transitory computer-readable medium of claim 8, wherein execution of the processor-executable instructions further causes the one or more processors to:
receive traffic, from the wireless network, for the UE; and
simultaneously output the traffic, for the UE, to the first DU and the second DU, prior to attachment by the UE to the second DU.

13. The non-transitory computer-readable medium of claim 8, wherein execution of the processor-executable instructions further causes the one or more processors to:
monitor a wireless connection between the UE and the first DU to determine a first measure of quality of the wireless connection;
determine that the first measure of quality of the wireless connection between the UE and the first DU exceeds a first threshold but does not exceed a second threshold, wherein the identification of the second DU as a candidate for attachment is performed based on the determination that the first measure of quality of the wireless connection between the UE and the first DU exceeds the first threshold;
continue to monitor the wireless connection between the UE and the first DU to determine a second measure of quality of the wireless connection; and
determine that the second measure of quality of the wireless connection between the UE and the first DU exceeds the second threshold, wherein the determination that the UE should attach to the second DU is based on the determination that the second measure of quality of the wireless connection between the UE and the first DU exceeds the second threshold.

14. The non-transitory computer-readable medium of claim 8, wherein execution of the processor-executable instructions further causes the one or more processors to:
continue providing context information for traffic associated with the UE to the first DU after attachment of the UE to the second DU.

15. A method, comprising:
identifying, by one or more devices and for a User Equipment ("UE") that receives wireless connectivity to a wireless network via attachment to a first Distributed Unit ("DU") of the wireless network, a second DU that is a candidate for attachment to the UE;
providing, by the one or more devices and to the second DU and prior to attachment of the UE to the second DU, context information for traffic associated with the UE;
determining by the one or more devices and after providing the context information to the second DU, that the UE should attach to the second DU;
instructing, by the one or more devices and based on determining that the UE should attach to the second DU, the UE to attach to the second DU, wherein the second DU uses the context information to seamlessly continue to provide wireless connectivity to the UE;
simultaneously providing, after the UE attaches to the second DU, updated context information and traffic for the UE to the first DU and the second DU;
tracking an amount of time that has passed since the UE last attached to the first DU;
determining, based on the tracking, that at least a threshold amount of time has passed since the UE last attached to the first DU; and
based on determining that at least the threshold amount of time has passed since the UE last attached to the first DU, ceasing providing the updated context information to the first DU.

16. The method of claim 15, wherein the context information includes one or more sequence numbers.

17. The method of claim 16, wherein the one or more sequence numbers include one or more Radio Link Control ("RLC") sequence numbers.

18. The method of claim 15, further comprising:
simultaneously providing the same context information to the first DU and the second DU prior to the UE attaching to the second DU.

19. The method of claim 15, further comprising:
receiving traffic, from the wireless network, for the UE; and
simultaneously outputting the traffic, for the UE, to the first DU and the second DU, prior to attachment by the UE to the second DU.

20. The method of claim 15, further comprising:
monitoring a wireless connection between the UE and the first DU to determine a first measure of quality of the wireless connection;
determining that the first measure of quality of the wireless connection between the UE and the first DU exceeds a first threshold but does not exceed a second threshold, wherein the identification of the second DU as a candidate for attachment is performed based on the determination that the first measure of quality of the wireless connection between the UE and the first DU exceeds the first threshold;
continuing to monitor the wireless connection between the UE and the first DU to determine a second measure of quality of the wireless connection; and
determining that the second measure of quality of the wireless connection between the UE and the first DU exceeds the second threshold, wherein the determination that the UE should attach to the second DU is based on the determination that the second measure of quality of the wireless connection between the UE and the first DU exceeds the second threshold.

\* \* \* \* \*